United States Patent Office 3,373,018
Patented Mar. 12, 1968

3,373,018
PRODUCTION OF RIGID SHAPES OF REFRACTORY METALS BY DECOMPOSITION OF THE METAL HEXAFLUORIDE IN THE INTERSTICES OF A GREEN COMPACT
Joseph H. Oxley and John M. Blocher, Jr., Columbus, Ohio, assignors, by mesne assignments, to Allied Chemical Corporation, New York, N.Y., a corporation of New York
No Drawing. Filed Feb. 17, 1965, Ser. No. 433,484
4 Claims. (Cl. 75—211)

This invention relates to production of unitary, rigid shapes of refractory metals.

Refractory metal shapes, because of exceptional retention of mechanical and chemical properties at high temperatures, are quite useful. To mention only a few uses and applications wherein such properties are particularly advantageous, there are: filaments; rocket nozzles; heat shields; porous filters; linings; process vessels; ion emitters; and the like.

In the past, refractory metal powders or particles have been consolidated into cohered shapes by powder metallurgical techniques, usually involving a sintering at high temperatures of pressed masses of the refractory particles. In some teachings, the sinterings have been carried forth in special atmospheres, such as nonoxidizing gases and the like. In some instances, these special atmospheres have included halogen atmospheres, and even halogen salts of refractory metal, and hydrogen. In the latter, as illustrated by U.S. Patent 1,226,925, powdered tungsten is hydraulically pressed and heated in an atmosphere of hydrogen until of a strength for easy handling and then further sintered at a high temperature in the presence of tungsten hexachloride and dry hydrogen, to cause a deposit of tungsten to form in and to permeate a mass of powdered tungsten which is being sintered. The product is a refractory metal body composed of partially sintered and partially deposited tungsten metal. Disadvantageously, all such consolidation techniques for consolidating refractory particles into a unitary shape require relatively high temperatures approaching the melting point of the particles involved and generally result in dimensional changes of the pressed powdered shapes during sintering.

An object of the invention is to consolidate particles of refractory metal into a unitary, rigid, desired shape.

Another object is to consolidate refractory metal particles into a predetermined, rigid shape at temperatures significantly lower than the fusion temperature of the refractory metal.

A further object is to chemically sinter refractory metal particles, packed loosely in a predetermined shape, without significant dimensional changes in the shape during such consolidation.

A further object is to chemically sinter refractory metal particles through a sequential formation first of a subhalide formed and deposited interstitially from a higher halide of a refractory metal and second of the refractory metal from the deposited lower halide throughout the interstices so as to join the particles into a unitary rigid body.

An additional object is to provide a chemically sintered, rigid, refractory metal body consisting essentially in part of particles of the refractory metal and in part of interstitial deposits of the refractory metal joining the particles in the body.

All the preceding, and numerous other objects, will be apparent to those skilled in the art, from the disclosure which follows.

In the process of the invention, a plurality of refractory metal particles are packed loosely, e.g., as by a slight vibration thereof, into a mass of predetermined shape defined by a container. When so packed, the mass is maintained with the particles stagnant throughout and at a temperature requisite for reacting the refractory metal particles with a higher halide of the refractory metal so as to form and to deposit interstitially a subhalide of the refractory metal upon flowing vapor of the higher halide through the mass. The flowing of the higher halide then is interrupted, and hydrogen gas passed through the mass of loosely packed stagnant particles having subhalide deposited interstitially therein while maintaining the mass at a temperature suitable for hydrogen reduction of the interstitially deposited subhalide in the refractory metal. This sequence of steps, first of forming and depositing the subhalide interstitially and then second of reducing the interstitially deposited subhalide to the refractory metal by hydrogen gas is repeated to accumulate a desired thickness of interstitial deposited refractory metal. By the process there are accumulated interstitial deposits of refractory metal substantially uniform throughout the interstices of the mass of refractory metal particles.

As compared to prior art powder metallurgical consolidation techniques, the present process not only permits the use of lower consolidation temperatures but also enables the uniform consolidation of considerably larger refractory metal shapes.

By practice of the invention, there is produced a chemically sintered, rigid, refractory metal body comprised of a mass of refractory metal particles joined into a unitary predetermined shape by refractory metal deposited throughout interstices of the mass. Such a body can be produced in simple, diverse and complex predetermined shapes, and can be produced with a desired density up to that approaching its theoretical density. For example, for an all molybdenum body, a density of about 90 percent and higher of the theoretical density of pure solid molybdenum metal is obtainable. The consolidated body can be produced with a green strength adequate for many end uses directly, and also a green strength sufficient for subsequent handling, machining, impregnating, conventional sintering, hot pressing, arc melting, forging, rolling, gas pressure bonding, and like metallurgical processing techniques into dense metal bodies of well known utility.

Higher halides of refractory metals suitable for the process include those halides known to form stable subhalides of the refractory metal upon reaction of the refractory metal with the higher halides. A listing of such useful higher halides includes molybdenum hexafluoride; molybdenum hexachloride; tungsten hexachloride; tantalum pentafluoride; tantalum pentachloride; niobium pentafluoride; niobium pentachloride; rhenium pentafluoride; rhenium pentachloride; vanadium pentafluoride; vanadium pentachloride; chromic fluoride; and chromic chloride. All of the preceding listed higher halides are of refractory metals known to form at least one lower halide by reacting the higher halide with the refractory metal. For example, at a suitable elevated temperature, molybdenum hexafluoride reacts with molybdenum metal to form molybdenum subfluorides such as di- and trifluorides; similarly tungsten hexachloride reacts with tungsten metal to form tungsten subchlorides, such as di-, tri-, tetra- and pentachlorides; likewise molybdenum hexachloride reacts with molybdenum metal to form molybdenum subchlorides, such as di-, tri-, tetra- and pentachlorides; and niobium pentachloride reacts with niobium metal to form niobium subchlorides, such as di-, tri-, and tetrachlorides; and chromium trichloride reacts with chromium metal to form the dichloride.

The refractory metal particles chemically sintered by the process are normally of the same refractory metal as that of which the higher halide is comprised. For example, where the refractory metal higher halide is of molybdenum, the refractory metal particles normally are molybdenum metal particles. Such particles may be uniform and/or irregular in size, may be of smooth and/or rough surface and may be solid and/or hollow, and/or porous in nature. Uniformly sized particles are particularly useful, although particle size also can vary and also can range widely. Particles as fine as those retained on a 325 mesh screen (U.S. Sieve Series) to particles as large as those passing through a 2 and retained on a 3 mesh screen are useful. Particles of even smaller and larger sizes also can be chemically sintered, but generally yield bodies of low green strength unless sufficient refractory metal is deposited interstitially, with this generally requiring uneconomical and lengthy process time.

The process is carried forth in a container which defines and circumscribes an enclosed volume conforming to a desired predetermined shape of the consolidated body. A suitable container has at least one inlet and at least one outlet so that gases and vapors can be flowed into, completely through, and out of the container. The container should be adapted for the flow of gases and vapors through the container so as to avoid any substantially "dead-flow" regions in the container's enclosed volume defining the predetermined shape. Where the consolidated body is to be a simple cylindrical rod shape, the container may be a cylinder. For producing rods of various cross sections other than circular, tubelike containers of appropriate cross sections are used. By employing a container composed of two concentric cylinders, there may be produced an annular body within the volume encompassed between the cylinders. Containers for even more diverse and complex shapes also are useful. Such containers may comprise two or more component parts and produce shapes, such as conical bodies, concave or convex curve bodies, cored bodies, sheets, and diverse and irregular and complex shapes so long as no "dead-flow" regions are found within the encompassed shapes of the container. For example, a shape of the general form of the human hand can be prepared with an inlet at the wrist portion of such a shaped container and outlets at the tip portions of the thumb and of each finger of such a shaped container.

Generally, the container is fabricated of a construction material which is relatively nonreactive with hydrogen gas and the refractory metal and higher and subhalides at the process conditions employed. The manner in which the container is to be removed from the chemically sintered product also will influence the choice of the container material. Numerous materials are useful for container construction and to mention only a few, there are nickel, copper, stainless steel, the refractory metal itself, zirconia, Hastelloy, alumina, Monel, copper, graphite, silica and the like.

In practice of the process, there is provided a heating means for maintaining the container and its contents at the temperatures employed in carrying forth the process. This heating means may be a heating mantle, such as electrical resistance windings around the container, induction heating means, electrical furnace elements, and the like. If desired, this heating means may be capable of maintaining a uniform temperature throughout the container and its contents; or may be such as to be capable of maintaining a temperature differential between various portions of the container. In practice of the process to produce chemically sintered bodies closely approaching the theoretical density of the solid refractory metal, it is desirable that the heating means maintain that portion of the refractory metal particles first contacted by the higher halide at somewhat lower temperatures than other portions of the packed particles subsequently contacted by the higher halide flowed through the particles.

Refractory metal particles of the desired material and size are poured or otherwise placed within the container to form a loosely packed body of the particular predetermined shape. The metal particles, when placed in the container, are vibrated gently so as to pack uniformly the particles without excessively large voids being present in the predetermined shape. The particles, if free flowing, may be simply poured and allowed to settle by gravity means into the predetermined shape defined by the container. To prevent the particles from falling or passing out of the container, the container's lower openings usually are filled with material such as loose packings of copper or nickel turnings, or covered with a screen or mesh and/or other porous covering material.

After the volume of the container, which defines the predetermined shape, has been filled with refractory metal particles, the container and its contents of loosely packed refractory metal particles are brought to desired temperature by the heating means. Suitable and useful temperatures for conversion of various higher halides of the refractory metals to their subhalides by reaction with the refractory metals are known to the art and are employed. These useful temperatures are considerably lower than the fusion or melting-point temperatures of the refractory metals.

Approximate temperature ranges generally employed in connection with specific higher halides are as follows:

| | Degrees C. |
|---|---|
| Molybdenum hexafluoride | 400 to 800 |
| Molybdenum hexachloride | 300 to 700 |
| Tungsten hexachloride | 200 to 1000 |
| Tantalum pentafluoride | 300 to 1000 |
| Tantalum pentachloride | 200 to 900 |
| Niobium pentafluoride | 300 to 1000 |
| Niobium pentachloride | 200 to 900 |
| Rhenium pentafluoride | 100 to 600 |
| Rhenium pentachloride | 200 to 800 |
| Vanadium pentafluoride | 50 to 1000 |
| Vanadium pentachloride | 50 to 1000 |
| Chromic fluoride | 500 to 1200 |
| Chromic chloride | 500 to 1200 |

For practice of the process, the container may be positioned vertically, horizontally, or diagonally as desired. Feed materials, preferably, are introduced to flow generally in a downward direction through the container through its loosely packed particles and out of the container; although the feed materials may be introduced to flow upwardly or even diagonally through the container, as desired, so long as the feed materials flow progressively through all portions of the mass of loosely packed metal particles.

For obtaining chemically sintered refractory metal bodies of high purity, it generally is desirable that the refractory metal particles and also the feed materials, i.e., the higher halide and hydrogen gas, be of high purity. Refractory metal particles of greater than 99 percent purity are commercially available. Commercially available refractory metal higher halides, which have been purified by distillation and/or by other means, are suitable. Desirably, the hydrogen gas employed has been diffused through palladium.

While the container and its contents of a mass of loosely packed refractory metal particles are being brought to desired temperature, it is desirable to flow an inert purging gas, such as argon or helium, or the like, through the container and its loosely packed particles. After suitable purging and bringing of the container and its contents to desired temperature, the flow of purging gas is interrupted and the vapor of a higher halide of the same refractory metal, as that of which the particles are comprised, is introduced and flowed through the loosely packed particles in the container. Flowing of the higher halide is continued until an appreciable amount of subhalide of the refractory metal has been formed and built up in the interstices of the mass of loosely packed metal particles. Usually this build-up occurs very rapidly and frequently within less than one to two minutes or so, depending on the temperature at which the particles are maintained. The extent of the build-up of the subhalide interstitial deposit can be controlled by temperature and total flow of reactants, or in cases where a few rather than many steps are used to achieve the impregnation, the build-up can be indirectly observed from measurement of the pressure drop across the mass of particles. When this pressure drop increases to such an extent that it is difficult to introduce and flow the halide through the mass of particles or when the pressure drop reaches a constant value, adequate subhalide interstitial deposit has occurred. At this time, the introduction and flowing of the higher halide is interrupted, and, desirably, a purging gas, such as argon or the like, flowed through the mass of particles for a short interval, generally a minute or less, sufficient to purge unreacted higher halide from the container and the mass of particles. Hydrogen gas is then introduced and flowed through the container and the mass of particles having subhalide interstitially deposited therein. During the flowing of the hydrogen gas, the container and its contents are maintained at a temperature conducive to reduction by the hydrogen gas of the subhalide to the refractory metal. This temperature may be, and generally is, the same temperature at which the mass of particles were maintained when the higher halide was introduced and flowed therethrough. However, higher and lower temperatures, as known to the art, for the reduction of the subhalide to the refractory metal, may be used if desired. Hydrogen gas is flowed in an amount and for a time requisite to reduced substantially all of the interstitially deposited subhalide to the refractory metal. Usually, the total amount of hydrogen gas, which is flowed, at least several times the stoichiometric amount required to convert all of the interstitially deposited subhalide to the refractory metal. The extent of conversion of the subhalide to the refractory metal may be followed by measurement and observation of a noticeable decrease in pressure drop across the mass of particles as the hydrogen flow proceeds. When the decrease in pressure drop levels off and reaches a minimum, more than sufficient hydrogen gas has been flowed through to reduce the amount of interstitially deposited subhalide. The process is then repeated, if necessary, to achieve the desired degree of bonding or density.

Rather than follow the course of the process of the invention, including the build-up of the subhalide and conversion of the subhalide to refractory metal, by means of pressure-drop changes across the mass of particles, if desired, one can follow the course of the reaction by the over-all weight changes of the container and its contents during the practice of the process. To do so, a means should be provided to measure the over-all weight changes of the container and its contents during various stages of carrying forth of the process. During subhalide build-up interstitially of the mass of the particles, the over-all weight increases, and as the subhalide is converted to the refractory metal, the over-all weight decreases, with the weight change between the initial weight before subhalide build-up and the final weight after subhalide conversion to the refractory metal being the amount of refractory metal deposited during that particular sequence of process steps. When a further introduction of halide results in no significant over-all weight increase, then a sufficient amount of the subhalide has been deposited interstitially. During hydrogen reduction, when further hydrogen introduction results in no further significant weight decrease, then substantially all of the interstitially deposited subhalide has been reduced and further introduction of hydrogen is unnecessary.

Following the sequence of steps of (a) introducing vapor of a higher halide of the refractory metal to form interstitial deposits of a subhalide of the refractory metal; (b) interrupting the introduction of the higher halide and purging with an inert gas to remove unreacted higher halide; and (c) introducing hydrogen gas to reduce the interstitial deposits of subhalide to the refractory metal, one usually (d) purges the container and its contents of hydrogen and of any waste gases by flowing a purging gas, such as argon or the like, therethrough. By repeating the sequence of steps (a), (b), (c), and (d) in order for a number of times, one may build up progressively refractory metal deposits in the interstices of the mass of refractory metal particles to provide a chemically sintered body of desired density. Upon each completed sequence of these process steps, there accumulates additional refractory metal deposit joining the particles into a unitary, rigid body of predetermined shape. By repeating this sequence of process steps for a sufficient number of times, one can produce chemically sintered bodies approaching the theoretical density of the refractory metal, or, if desired, by employment of a lesser number of sequences of the process steps, one can prepare chemically sintered porous bodies of refractory metal having almost any apparent density desired between the apparent density of the initial mass of loosely packed refractory metal particles and about 90% and higher of the theortical density of the solid refractory metal.

Following completion of the last of the sequences of the process steps, hydrogen or an inert gas, such as argon or the like, is flowed through the container while the heating means is shut off and the container and its contents are permitted to cool. Upon cooling of the container and its contents to ambient temperature, or other temperature satisfactory for handling of the same, the container is removed from its contents, which now are the chemically sintered body. Where the container is of a refractory metal, for some end applications it is unnecessary to remove the container material from the chemically sintered body. Removal of the container may be by conventional mechanical means, such as sawing, cutting, planing, milling, etc., of the container from the chemically sintered body; or, if desired, the container may be stripped by use of appropriate solvents or chemical agents which dissolve or volatilize the container material but which do not materially affect the chemically sintered body inside of the container.

The invention now will be further explained and described, and be more clearly apparent from a number of examples which now follow.

*Example 1*

A vertically positioned, cylindrical nickel pipe, about ¾ in. inside diameter by 12 inches long, having a porous barrier of a 100 mesh (U.S. Sieve Series) brass screen silver soldered in a lower portion thereof is employed as the container for this example. Molybdenum metal particles of −20 to +40 mesh size are poured in the top opening of the container to provide about a ¾ in. diameter by 7 inches long column of loosely packed stagnant particles of molybdenum metal resting on the brass screen. The nickel pipe container is encircled by an electrically heated muffle furnace about five inches long with the top of the furnace at the same level as the top of the seven inch high column of molybdenum metal particles.

While the container and its contents are brought to about 800° C., argon gas is flowed in the top, downward through the molybdenum metal particles, and out the bottom. Upon the container's contents reaching 800° C., the flow of argon gas is interrupted and the following sequential introduction of materials made for downward flow through the container and its contents: (a) 6 to 10 grams of $MoF_6$ vapor (from a 138° F. bath of $MoF_6$) for 1 minute; and then this flow ceased and followed by (b) argon gas at the rate of 0.1 ft.$^3$/min. for 1 minute; and this flow ceased and followed by (c) hydrogen gas at the rate of 0.5 ft.$^3$/min. for 12 minutes; and then this flow ceased and followed by (d) argon gas at the rate of 0.1 ft.$^3$/min. for one minute. This sequence of steps (a), (b), (c), and (d) is repeated about 30 times, at which time heating is discontinued and the container and its contents cooled while argon gas flows therethrough. When the container reaches about room temperature, it is stripped from its contents which now are a chemically sintered molybdenum body. Data for this example follow:

Column of Mo particles:
- Weight _____ 334 grams.
- Height _____ 7 in.
- Diameter _____ ¾ in.
- Apparent density _____ 64% of solid Mo metal.

Pressure differential between top and bottom of column (inches H₂O):

| Sequence No. | 1st | 10th | 20th | 30th |
|---|---|---|---|---|
| When flowing MoF₆ | 1.0 | 1.5 | 2.0 | 5.2 |
| When flowing argon | 2.0 | 5.1 | 6.6 | 12.0 |
| When flowing H₂ | 4.3 | 7.5 | 10.1 | 18.5 |

Duration of run:                        Hr.
- Preheat to 800° C. _____ ¾
- Feed cycle sequences at 800° C. _____ 7½
- Cooling to about 30° C. _____ ½

Total _____ 8¾

Total MoF₆ feed _____ 230 grams.
Conversion of MoF₆ to Mo ___ 91%.
Product:
- Weight _____ 430 grams.
- Length _____ 7 in.
- Diameter _____ ¾ in.
- Newly deposited Mo ____ 22.3%.
- Apparent density _____ 85% of solid Mo metal.

*Example 2*

Example 1 is repeated except the flows of argon, MoF₆, and H₂ are upward through the container and a column of loosely packed stagnant particles of molybdenum metal which are retained in a stagnant state by a brass screen packing resting on top of the column. A chemically sintered body, the substantial equivalent of that of Example 1, is obtained.

*Example 3*

Another chemically sintered molybdenum body is prepared substantially by the procedure of Example 1 with data of the process run and product of this example as follows.

Particles:                           Mo.
- Material _____ −20 to +60 mesh (av.
- Size _____ dia. 1090 microns).

Column of particles:
- Weight _____ 284 grams.
- Height _____ 6 inches.
- Diameter _____ ¾ inch.
- Density _____ 65% of solid Mo metal.

Step sequence (downward flow):
(a) 2 to 16 grams of MoF₆ vapor (from about 125° F. bath, MoF₆) for one minute and this flow ceased and followed by
(b) argon gas at the rate of 0.1 ft.³/min. for 2 minutes and then this flow ceased and followed by
(c) hydrogen gas at the rate of 0.4 ft.³/min. for 10 minutes and then this flow ceased and followed by
(d) argon gas at the rate of 0.1 ft.³/min. for two minutes.

Number of repeated step sequences _____ 21
Total MoF₆ _____ grams__ 190
Conversion of MoF₆ to Mo _____ percent__ 65
Pressure differential between top and bottom of column (inches H₂O):

| Sequence No. | 1st | 10th | 20th |
|---|---|---|---|
| When flowing MoF₆ | >0.8 | 0.6 | 2.0 |
| When flowing argon | 1.2 | 2.9 | 8.5 |
| When flowing H₂ | 2.1 | 5.3 | 11.7 |

Duration of run:                        Hr.
- Preheat to 700° C. _____ ¾
- Feed cycle sequences at 700° C. _____ 5¼
- Cooling to 30° C. _____ 1¼

Total _____ 7¼

Product:
- Weight _____ 338 grams.
- Length _____ 6 inches.
- Diameter _____ ¾ inch.
- Newly deposited Mo ____ 16%.
- Apparent density _____ 78% of solid Mo metal.

*Example 4*

By proceeding in substantial accordance with the procedure of Example 1, and by employing tantalum metal particles, maintained at about 600° C., and tantalum pentachloride as the higher halide, there is produced a chemically sintered, rigid body consisting essentially in part of tantalum metal particles and in part of interstitial deposits of tantalum metal joining the particles in the body.

*Example 5*

By proceeding in substantial accordance with the procedure of Example 1, and by employing rhenium metal particles, maintained at about 400° C., and rhenium pentafluoride as the higher halide, there is produced a chemically sintered, rigid body consisting essentially in part of rhenium metal particles and in part of interstitial deposits of rhenium metal joining the particles in the body.

*Example 6*

By proceeding in substantial accordance with the procedure of Example 1 and by employing niobium particles, maintained at about 500° C., and niobium pentachloride as the higher halide, there is produced chemically sintered, rigid body consisting essentially in part of niobium metal particles and in part of interstitial deposits of niobium metal joining the particles in the body.

*Example 7*

By proceeding in substantial accordance with the procedure of Example 1, and by employing chromium metal particles, maintained at about 900° C., and chromic fluoride as the higher halide, there is produced a chemically sintered, rigid body consisting essentially in part of chromium metal particles and in part of interstitial deposits of chromium metal joining the particles in said body.

*Example 8*

By proceeding in substantial accordance with the procedure of Example 1, and by employing vanadium metal particles, maintained at about 500° C., and vanadium pentafluoride as the higher halide, there is produced a chemically sintered, rigid body consisting essentially in part of vanadium metal particles and in part of interstitial deposits of vanadium metal joining the particles in said body.

Various embodiments, changes, and modifications will be apparent, from the foregoing description and examples, to those skilled in the art. All such embodiments, changes, and modifications that fall within the true spirit of the invention are intended to be included with the invention limited only as set forth in the appended claims.

We claim:
1. A process for producing a chemically sintered, rigid body of particles of a refractory metal joined by interstitial deposits of the same refractory metal, which process comprises:
(a) introducing vapor of a higher halide of a refractory metal into interstices of a mass of stagnant particles of the same refractory metal maintained at a tem- perature conducive to formation and deposition of a subhalide of the refractory metal by reaction of said higher halide with said particles;

(b) interrupting the introduction of said vapor; and (c) introducing hydrogen gas into said interstices containing said subhalide, so formed and deposited, maintained at a temperature conducive to reduction of the subhalide to the refractory metal by reaction of hydrogen gas with the subhalide.

2. A process for producing a chemically sintered, rigid body of molybdenum particles joined by interstitially deposited molybdenum metal, which process comprises:

(a) flowing vapor of a molybdenum hexahalide into interstices of a mass of stagnant heated particles of molybdenum metal maintained at a temperature conducive to reaction of said vapor with said heated mass to form an interstitial deposit of a molybdenum subhalide;

(b) interrupting the flowing of said vapor; and then (c) flowing hydrogen gas into said interstices of said stagnant heated particles maintained at a temperature conducive to reaction of said hydrogen gas with said interstitial deposits to form interstitially deposited molybdenum metal.

3. The process of claim 2, employing molybdenum hexafluoride as the molybdenum hexahalide with said feed particles maintained throughout steps (a), (b), and (c) at temperatures between about 700° and 900° C.

4. The process of claim 2 in which, following step (c), there is included: step (d) of interrupting the flowing of the hydrogen gas; and then repetition of steps (a), (b), (c), and (d) in order for a number of times required to provide a chemically sintered, rigid body of desired density.

References Cited

UNITED STATES PATENTS

| | | |
|---|---|---|
| 3,072,983 | 1/1963 | Brenner. |
| 3,114,961 | 12/1963 | Chambers et al. __ 117—107.2 X |
| 3,139,658 | 7/1964 | Brenner _____ 117—107.2 X |
| 3,157,532 | 11/1964 | Galmiche _____ 117—107.2 X |
| 3,160,517 | 12/1964 | Tenhin _____ 117—107.2 X |
| 3,185,566 | 5/1965 | Galmiche _____ 75—212 |

OTHER REFERENCES

Chemical Engineering; June 12, 1961; vol. 68; No. 12; "Vapor Phase Process Deposits Impervious Coatings of Tungsten."

CARL D. QUARFORTH, *Primary Examiner.*

BENJAMIN R. PADGETT, *Examiner.*

A. J. STEINER, *Assistant Examiner.*